(12) United States Patent
Tong et al.

(10) Patent No.: US 9,392,089 B2
(45) Date of Patent: Jul. 12, 2016

(54) MOBILE ELECTRONIC DEVICE AND SOUND PLAYBACK METHOD THEREOF

(75) Inventors: Hann-Shi Tong, Taoyuan County (TW); Lei Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 1177 days.

(21) Appl. No.: 13/197,795

(22) Filed: Aug. 4, 2011

(65) Prior Publication Data

US 2012/0063607 A1    Mar. 15, 2012

(30) Foreign Application Priority Data

Sep. 13, 2010  (TW) ................................ 99130911 A

(51) Int. Cl.
| | |
|---|---|
| *H04R 29/00* | (2006.01) |
| *H04M 1/60* | (2006.01) |
| *H04S 1/00* | (2006.01) |
| *H04S 3/00* | (2006.01) |
| *H04M 1/02* | (2006.01) |

(52) U.S. Cl.
CPC .......... *H04M 1/6016* (2013.01); *H04M 1/0245* (2013.01); *H04S 1/002* (2013.01); *H04S 3/002* (2013.01); *H04M 1/0214* (2013.01); *H04M 1/0235* (2013.01); *H04M 2250/12* (2013.01); *H04R 2499/11* (2013.01)

(58) Field of Classification Search
CPC ...... H04R 1/34; H04R 1/345; H04R 2430/20; H04R 2430/25; H04R 1/02; H04R 2499/11; H04R 2499/13; H04S 7/30; H04S 7/301; H04S 7/302; H04S 7/303; H04S 7/308; H04S 1/002; H04S 3/002; H04M 1/6016; H04M 1/0214; H04M 1/0235; H04M 1/0245; H04M 2250/12

USPC ............................................................ 381/59
See application file for complete search history.

(56) References Cited

U.S. PATENT DOCUMENTS

| | | | | |
|---|---|---|---|---|
| 6,801,628 | B1 * | 10/2004 | Thiel ................................ 381/56 |
| 7,142,683 | B1 * | 11/2006 | Markow et al. ............... 381/333 |
| 8,290,185 | B2 * | 10/2012 | Kim ............................... 381/300 |
| 2005/0185813 | A1 | 8/2005 | Sinclair et al. |

(Continued)

FOREIGN PATENT DOCUMENTS

| | | |
|---|---|---|
| CN | 101263742 | 9/2008 |
| CN | 101808259 | 8/2010 |

(Continued)

OTHER PUBLICATIONS

"Office Action of Counterpart Taiwan Application", issued on Dec. 23, 2013, p. 1-p. 8.

(Continued)

*Primary Examiner* — Davetta W Goins
*Assistant Examiner* — Daniel Sellers
(74) *Attorney, Agent, or Firm* — Jianq Chyun IP Office

(57) ABSTRACT

A mobile electronic device and a sound playback method thereof are provided. The mobile electronic device includes a sensor, a speaker, and a controller coupled to the sensor and the speaker. The sensor detects whether the speaker is blocked or not. When the speaker is blocked, the controller multiplies a sound signal by a transfer function and then outputs the multiplied sound signal. The speaker plays the sound signal outputted by the controller. The transfer function changes the direction in which the speaker plays the sound signal.

19 Claims, 3 Drawing Sheets

(56) References Cited

U.S. PATENT DOCUMENTS

| | | | |
|---|---|---|---|
| 2005/0221867 A1* | 10/2005 | Zurek et al. | 455/569.1 |
| 2007/0123321 A1 | 5/2007 | Konomi et al. | |
| 2007/0293188 A1* | 12/2007 | Houghton et al. | 455/404.2 |
| 2008/0165979 A1* | 7/2008 | Takumai | 381/59 |
| 2009/0196440 A1* | 8/2009 | Suzuki | 381/160 |
| 2012/0039480 A1* | 2/2012 | Willems | 381/71.1 |
| 2013/0188807 A1* | 7/2013 | Slotte | 381/99 |

FOREIGN PATENT DOCUMENTS

| | | |
|---|---|---|
| EP | 1670221 | 6/2006 |
| GB | 2458832 | 10/2009 |
| TW | 200520588 | 6/2005 |
| TW | 200719672 | 5/2007 |
| TW | 201014317 | 4/2010 |
| WO | 9827710 | 6/1998 |
| WO | WO 2010064104 A1 * | 6/2010 |

OTHER PUBLICATIONS

"Extended European Search Report of European Counterpart Application", issued on Nov. 21, 2011, p. 1-p. 6.

"Office Action of China Counterpart Application", issued on Sep. 3, 2013, p. 1-p. 5.

"Office Action of Taiwan Counterpart Application", issued on Oct. 14, 2014, p. 1-p. 10.

* cited by examiner

MOBILE ELECTRONIC DEVICE AND SOUND PLAYBACK METHOD THEREOF

CROSS-REFERENCE TO RELATED APPLICATION

This application claims the priority benefit of Taiwan application serial no. 99130911, filed Sep. 13, 2011. The entirety of the above-mentioned patent application is hereby incorporated by reference herein and made a part of this specification.

BACKGROUND

1. Field of the Invention

The invention relates to a mobile electronic device capable changing a sound playback direction and a sound playback method thereof. Particularly, the invention relates to a mobile electronic device capable changing the sound playback direction when the speaker is blocked and a sound playback method thereof.

2. Description of Related Art

Besides a function of making phone calls, a mobile phone in the market also has sound-related functions such as alarm clock or music playback, etc. Moreover, the mobile phone can also send various notification sounds according to user settings, for example, when an E-mail or a message is received, or when the battery is out of power, a corresponding notification sound is sent. The above sounds are all played by a speaker of the mobile phone.

Profile designs of the current mobile phones all focus on aesthetics. To achieve an integral effect of a front side of the mobile phone, the speaker is probably disposed on a backside of the mobile phone. When the mobile phone is disposed on a desk, since the backside of the mobile phone faces downwards, the sound played by the speaker is blocked by the desk, so that a sound volume is decreased, which may lead to a result that the user cannot hear or clearly hear the sound. Moreover, in some of the mobile phones, the speaker is disposed inside a slide cover, and when the slide cover is closed, the speaker is blocked, which may also lead to a problem of sound volume decrease.

SUMMARY OF THE INVENTION

The invention is directed to a mobile electronic device, and it can resolve a problem of sound volume decrease that occurs when the speaker is blocked.

The invention is directed to a sound playback method of a mobile electronic device, and it can resolve a problem of sound volume decrease that occurs when the speaker is blocked.

The invention provides a mobile electronic device including a sensor, a speaker, and a controller coupled to the sensor and the speaker. The sensor detects whether the speaker is blocked or not. When the speaker is blocked, the controller multiplies a sound signal by a transfer function and outputs the multiplied sound signal. The speaker plays the sound signal outputted by the controller. The transfer function changes a direction in which the speaker plays the sound signal.

When the speaker is not blocked, the controller directly outputs the sound signal without multiplying the sound signal by the transfer function.

In an embodiment of the invention, the sensor at least includes one of a light sensor, a proximity sensor and a magnetic sensor. The sensor detects whether the speaker is blocked or not by measuring the brightness of ambient environment, or by measuring the distance between the speaker and the object in front of the speaker, or by sensing a variation of magnetic force.

In an embodiment of the invention, the mobile electronic device includes a first part and a second part, wherein the first part includes the speaker and the sensor. The sensor detects whether the speaker is blocked by the second part or not.

In an embodiment of the invention, the second part includes a magnet, and the sensor detects whether the speaker is blocked by the second part or not by sensing the variation of magnetic force caused by the magnet.

In an embodiment of the invention, the transfer function changes the direction in which the speaker plays the sound signal by a predetermined angle. The predetermined angle is greater than or equal to 45 degrees and is smaller than or equal to 90 degrees, and for example, the predetermined angle is 75 degrees.

The invention provides a sound playback method of the above mobile electronic device. The method includes the following steps. First, the mobile electronic device detects whether the speaker of the mobile electronic device is blocked or not. When the speaker is blocked, the mobile electronic device multiplies a sound signal by a transfer function and outputs the multiplied sound signal. Then, the speaker plays the sound signal outputted. When the speaker is not blocked, the sound signal is directly outputted and played without multiplying the sound signal by the transfer function. The transfer function changes the direction in which the speaker plays the sound signal.

According to the above descriptions, in the invention, when the speaker is blocked, the play direction of the sound signal is changed, so that the sound is not blocked, so as to resolve the problem of sound volume decrease of the related art.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
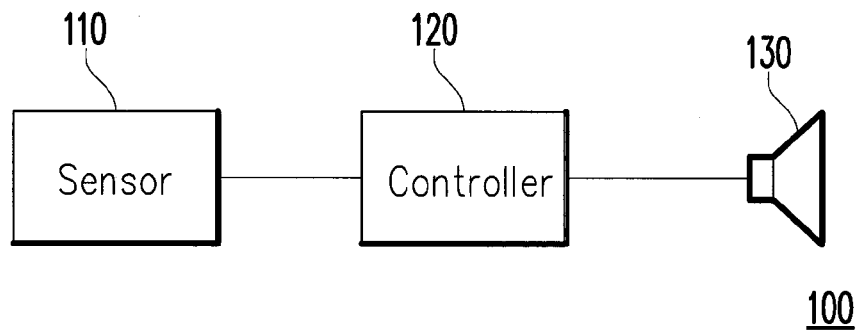
FIG. 1 is a schematic diagram illustrating a mobile electronic device according to an embodiment of the invention.

FIG. 1 is a schematic diagram illustrating a mobile electronic device 100 according to an embodiment of the invention. The mobile electronic device 100 can be a mobile phone, a multimedia player, a personal digital assistant (PDA), a notebook computer, or other similar devices. The mobile electronic device 100 includes a sensor 110, a controller 120 and a speaker 130 sequentially connected in series.

Figure 2:
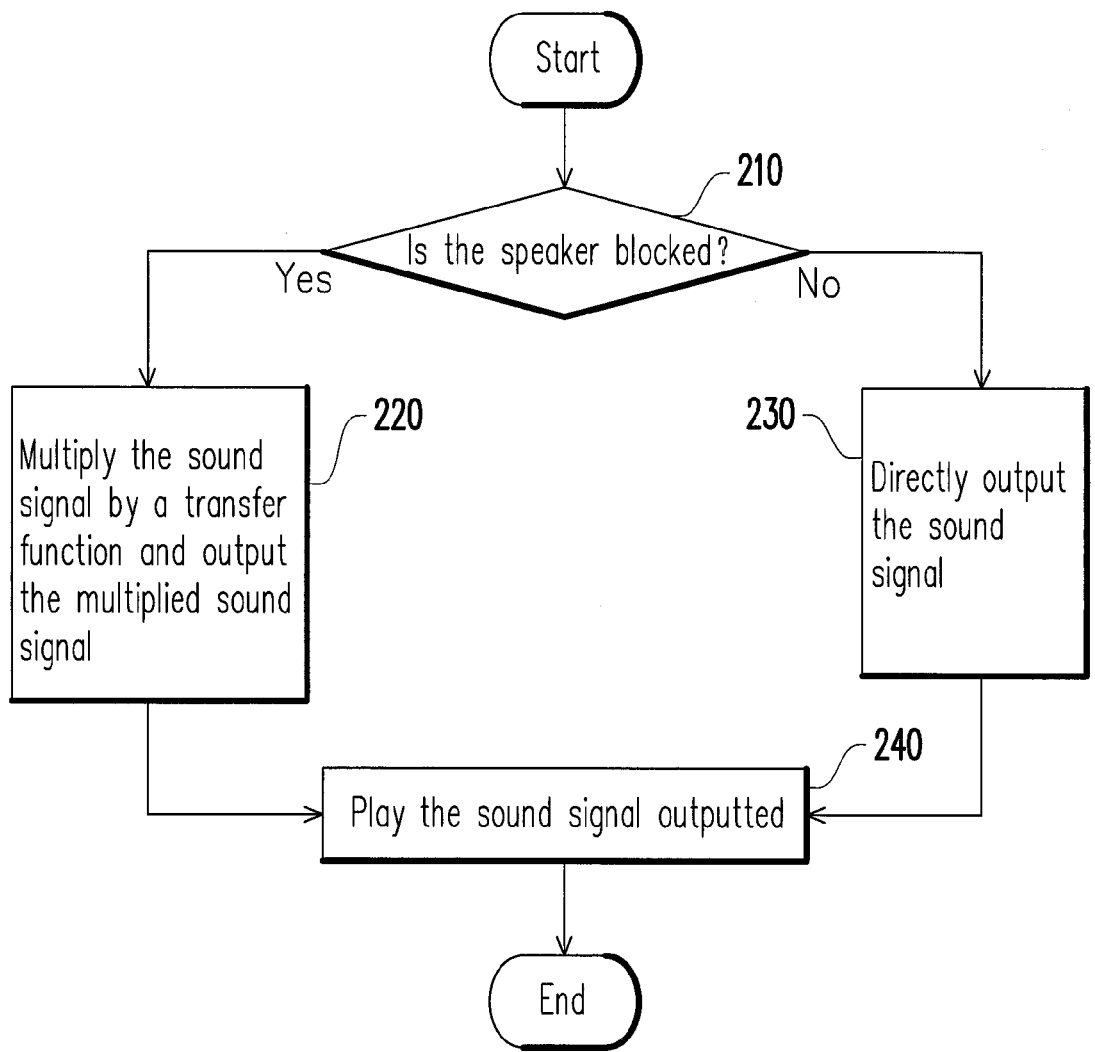
FIG. 2 is a flowchart illustrating a sound playback method of a mobile electronic device according to an embodiment of the invention.

FIG. 2 is a flowchart illustrating a sound playback method of the mobile electronic device 100 according to an embodiment of the invention. The sound playback method is described below with reference to FIG. 1 and FIG. 2. First, the sensor 110 detects whether the speaker 130 is blocked or not (step 210). The sensor 110 can be a light sensor, a proximity sensor, or a magnetic sensor, or a combination thereof. The light sensor may measure a brightness of ambient environment to detect whether the speaker 130 is blocked or not. When the speaker 130 is blocked, the ambient environment is generally darkened. For example, the sensor 110 may determine that the speaker 130 is blocked when the brightness is lower than a predetermined threshold value. The proximity sensor may measure a distance between the speaker 130 and an object in front of the speaker 130 through an infrared approach, so as to detect whether the speaker 130 is blocked or not. For example, the sensor 110 may determine that the speaker 130 is blocked when the distance between the speaker 130 and the object in front of the speaker 130 is smaller than a predetermined threshold value.

The mobile electronic device 100 may include two parts, and the two parts can be slid, rotated, opened/closed relative to each other. Taking a slide mobile phone as an example, the first part is, for example, a main body, and the second part is, for example, a slide cover. The first part includes the speaker 130 and the sensor 110, and the sensor 110 can detect whether the speaker 130 is blocked by the second part or not. For example, the second part may include a magnet, and the sensor 110 may be a magnetic sensor. When the two parts are relatively moved, the distance between the magnet and the magnetic sensor is varied, so that the magnitude of the magnetic force detected by the magnetic sensor is also varied. The sensor 110 can detect whether the speaker 130 is blocked by the second part or not by sensing the variation of the magnetic force caused by the magnet.

Referring to the flowchart of FIG. 2, after the step 210, when the speaker 130 is blocked, the controller 120 multiplies a sound signal to be played by a transfer function, and then outputs the multiplied sound signal (step 220), and the speaker 130 plays the sound signal outputted by the controller 120 (step 240). After the step 210, when the speaker is not blocked, the controller 120 directly outputs the sound signal without multiplying the sound signal by the transfer function (step 230). Then, the step 240 is executed, by which the speaker 130 plays the sound signal outputted by the controller 120.

Figure 3:
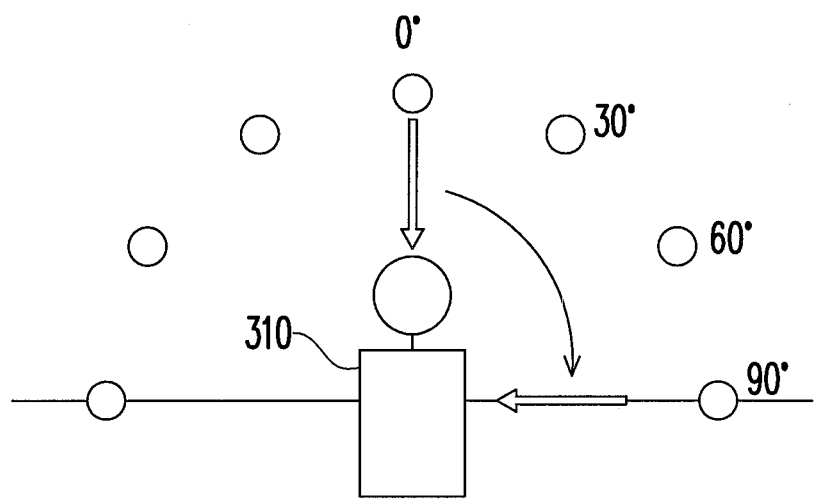
FIG. 3 is a schematic diagram illustrating a method of changing a sound direction according to an embodiment of the invention.

The transfer function is obtained from a current sound field reposition technology. Based on the sound field reposition technology, a user may feel that the sound comes from different angles, so as to achieve a three-dimensional (3D) surround effect. In an example of FIG. 3, a sound played by the speaker originally comes from a direction of 0 degree. After the sound signal is multiplied by a specific transfer function, the user may feel that the sound comes from a direction of 90 degrees.

Figure 4A:
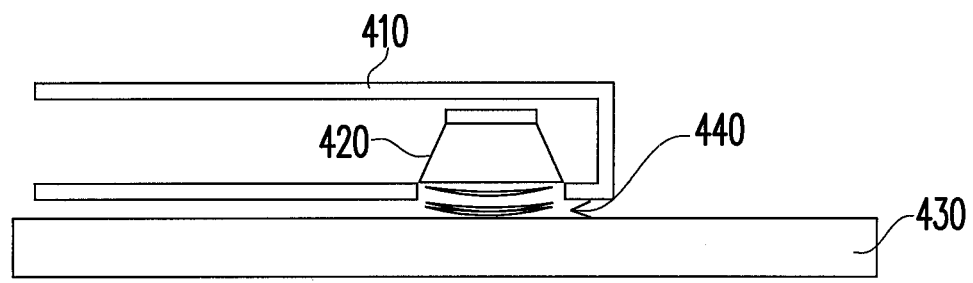
FIG. 4A and FIG. 4B are schematic diagrams illustrating a method of changing a sound playing direction according to an embodiment of the invention.
Figure 4B:
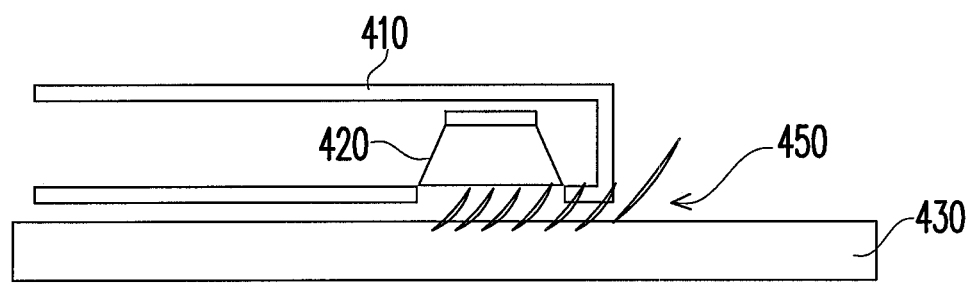
Figure 5A:
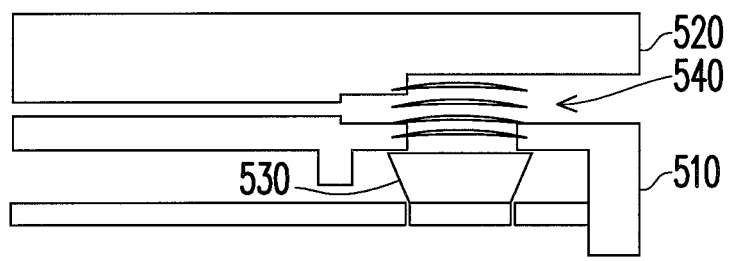
FIG. 5A and FIG. 5B are schematic diagrams illustrating a method of changing a sound playing direction according to another embodiment of the invention.
Figure 5B:
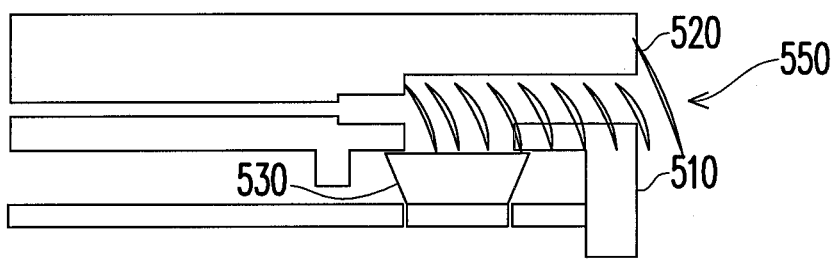

In the present embodiment, the transfer function is used to change the direction in which the speaker 130 plays the sound signal, as that shown in FIG. 4A and FIG. 5B. In examples of FIG. 4A and FIG. 4B, a mobile electronic device 410 includes a speaker 420, and the mobile electronic device 410 is disposed on a desk 430. If the sound signal is directly played, as shown in FIG. 4A, since the speaker 420 is blocked by the desk 430, the sound 440 played by the speaker 420 is blocked by the desk 430, thereby decreasing the sound volume. And thus, the listening effect of the user is decreased. If the sound signal is multiplied by the predetermined transfer function, the direction in which the speaker 420 plays the sound signal is changed by a predetermined angle as shown in FIG. 4B. In this way, the sound 450 played by the speaker 420 is not blocked, so that the user can clearly hear the sound 450.

In examples of FIG. 5A and FIG. 5B, the mobile electronic device includes two parts 510 and 520. The part 510 includes a speaker 530. If the sound signal is directly played, as shown in FIG. 5A, since the speaker 530 is blocked by the part 520, the played sound 540 is blocked by the part 520, thereby decreasing the sound volume. And thus, the listening effect of the user is decreased. When the sound signal is multiplied by the predetermined transfer function, the direction in which the speaker 530 plays the sound signal is changed by a predetermined angle as shown in FIG. 5B. In this way, the sound 550 played by the speaker 530 is not blocked, so that the user can clearly hear the sound 550.

The aforementioned transfer function is a mature technique that has been used for years. As long as the predetermined angle is determined, a corresponding transfer function is generated. Thus, the detailed description thereof is not repeated herein. Generally, a better effect is achieved when the predetermined angle is greater than or equal to 45 degrees and smaller than or equal to 90 degrees. In the examples of FIG. 4B and FIG. 5B, the predetermined angle is 75 degrees.

In summary, the sound playing direction is changed when the speaker is blocked, so that the sound is not blocked. In this way, the problem of sound volume decrease of the related art is resolved. The invention can improve user's experience, and also improve flexibility of designing a profile of the mobile electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A mobile electronic device, comprising:
   a speaker;
   a sensor, configured to detect whether the speaker is block or not; and
   a controller, coupled to the sensor and the speaker, when the speaker is blocked, the controller is configured to multiply a sound signal by a transfer function and output the multiplied sound signal, and the speaker is configured to play the sound signal outputted by the controller; and wherein the transfer function is obtained from a sound field reposition technology so that a user may feel that the sound comes of 90 degrees from the speaker playing the sound signal when the sensor indicates that the speaker is blocked, and that the user may feel the sound comes of 0 degree when the speaker is not blocked.

2. The mobile electronic device as claimed in claim 1, wherein the sensor at least comprises one of a light sensor, a proximity sensor and a magnetic sensor.

3. The mobile electronic device as claimed in claim 1, wherein the sensor detects whether the speaker is blocked or not by measuring a brightness of ambient environment.

4. The mobile electronic device as claimed in claim 1, wherein the sensor detects whether the speaker is blocked or not by measuring a distance between the speaker and an object in front of the speaker.

5. The mobile electronic device as claimed in claim 1, further comprising a first part and a second part, wherein the first part comprises the speaker and the sensor, and the sensor detects whether the speaker is blocked by the second part or not.

6. The mobile electronic device as claimed in claim 5, wherein the second part comprises a magnet, and the sensor detects whether the speaker is blocked by the second part or not by sensing a variation of magnetic force caused by the magnet.

7. The mobile electronic device as claimed in claim 1, wherein the transfer function changes the perceived direction of the sound signal outputted by the controller by a predetermined angle.

8. The mobile electronic device as claimed in claim 7, wherein the predetermined angle is greater than or equal to 45 degrees and is smaller than or equal to 90 degrees.

9. The mobile electronic device as claimed in claim 8, wherein the predetermined angle is 75 degrees.

10. The mobile electronic device as claimed in claim 1, wherein when the speaker is not blocked, the controller directly outputs the sound signal without multiplying the sound signal by the transfer function.

11. A sound playback method of a mobile electronic device, comprising:
   the mobile electronic device detecting whether a speaker of the mobile electronic device is blocked or not; and
   when the speaker is blocked, the mobile electronic device multiplying a sound signal by a transfer function and outputting the multiplied sound signal, wherein the speaker plays the sound signal outputted, and the transfer function is obtained from a sound field reposition technology so that a user may feel that the sound comes of 90 degrees from the speaker playing the sound signal when the sensor indicates that the speaker is blocked, and that the user may feel the sound comes of 0 degree when the speaker is not blocked.

12. The sound playback method of the mobile electronic device as claimed in claim 11, wherein the step of detecting whether the speaker is blocked or not comprises:
   detecting whether the speaker is blocked by measuring a brightness of ambient environment.

13. The sound playback method of the mobile electronic device as claimed in claim 11, wherein the step of detecting whether the speaker is blocked or not comprises:
   detecting whether the speaker is blocked by measuring a distance between the speaker and an object in front of the speaker.

14. The sound playback method of the mobile electronic device as claimed in claim 11, wherein the mobile electronic device comprises a first part and a second part; the first part comprises the speaker, and the step of detecting whether the speaker is blocked or not comprises:
   detecting whether the speaker is blocked by the second part or not.

15. The sound playback method of the mobile electronic device as claimed in claim 14, wherein the second part comprises a magnet, and the step of detecting whether the speaker is blocked by the second part or not comprises:
   detecting whether the speaker is blocked by the second part or not by sensing a variation of magnetic force caused by the magnet.

16. The sound playback method of the mobile electronic device as claimed in claim 11, wherein the transfer function changes the perceived direction of the sound signal outputted by the mobile electronic device by a predetermined angle.

17. The sound playback method of the mobile electronic device as claimed in claim 16, wherein the predetermined angle is greater than or equal to 45 degrees and is smaller than or equal to 90 degrees.

18. The sound playback method of the mobile electronic device as claimed in claim 17, wherein the predetermined angle is 75 degrees.

19. The sound playback method of the mobile electronic device as claimed in claim 11, further comprising:
   when the speaker is not blocked, directly outputting the sound signal without multiplying the sound signal by the transfer function.

* * * * *